(12) United States Patent
Eckhardt

(10) Patent No.: US 7,152,981 B2
(45) Date of Patent: *Dec. 26, 2006

(54) PROJECTION ILLUMINATION SYSTEM WITH TUNNEL INTEGRATOR AND FIELD LENS

(75) Inventor: Stephen K. Eckhardt, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/021,732

(22) Filed: Dec. 23, 2004

(65) Prior Publication Data

US 2005/0140940 A1    Jun. 30, 2005

Related U.S. Application Data

(63) Continuation of application No. 10/412,021, filed on Apr. 11, 2003, now Pat. No. 6,857,752.

(51) Int. Cl.
*G03B 21/28* (2006.01)

(52) U.S. Cl. .............................. 353/98; 353/102; 349/5; 362/559; 385/901

(58) Field of Classification Search ................. 353/38, 353/97, 98, 31, 34, 37, 33, 81, 102; 349/5, 349/7, 8, 9; 362/551, 559, 560, 561; 385/133, 385/901; 359/831, 833, 837; 348/742, 743, 348/771
See application file for complete search history.

(56) References Cited

U.S. PATENT DOCUMENTS

| | | |
|---|---|---|
| 1,351,562 A | 8/1920 | Foster |
| 1,577,388 A | 3/1926 | Twyman |
| 1,880,414 A | 10/1932 | Capstaff |
| 3,600,568 A | 8/1971 | Weyrauch et al. |
| 4,427,283 A | 1/1984 | Gasper |
| 4,466,717 A | 8/1984 | Meier et al. |
| 4,735,491 A * | 4/1988 | Takahashi ............... 359/652 |
| 4,918,583 A | 4/1990 | Kudo et al. |
| 5,050,974 A | 9/1991 | Takasugi et al. |
| 5,173,799 A * | 12/1992 | Tanuma ............... 359/326 |
| 5,371,626 A * | 12/1994 | Betensky ............... 359/399 |
| 5,541,765 A * | 7/1996 | Tanuma ............... 359/328 |
| 5,576,888 A | 11/1996 | Betensky |
| 5,625,738 A | 4/1997 | Magarill |
| 5,634,704 A | 6/1997 | Shikama et al. |
| 5,748,376 A | 5/1998 | Lin et al. |
| 5,868,481 A | 2/1999 | Conner et al. |
| 5,978,051 A | 11/1999 | Gohman et al. |
| 6,249,906 B1 | 6/2001 | Levine et al. |
| 6,332,688 B1 | 12/2001 | Magarill |
| 6,419,365 B1 | 7/2002 | Potekev et al. |
| 6,429,906 B1 | 8/2002 | Sekine et al. |

(Continued)

FOREIGN PATENT DOCUMENTS

WO    WO 01/72048 A2    9/2001

*Primary Examiner*—William C. Dowling
(74) *Attorney, Agent, or Firm*—George W. Jonas

(57) ABSTRACT

A projector illumination system includes a tunnel integrator incorporated with a field lens at its output end. One advantage of using the field lens is to form an image of the entrance end of the tunnel integrator at the secondary stop of the illumination system when combined with other relay and/or imager field lenses in the illumination system. This reduces vignetting, resulting in an increased uniformity of illumination, and increased light throughput.

23 Claims, 4 Drawing Sheets

U.S. PATENT DOCUMENTS

| | | |
|---|---|---|
| 6,461,001 B1 * | 10/2002 | Okamori et al. ............ 353/102 |
| 6,575,580 B1 | 6/2003 | Okamori et al. |
| 6,773,116 B1 | 8/2004 | De Vaan et al. |
| 2002/0109795 A1 | 8/2002 | Bruzzone et al. |
| 2003/0023231 A1 * | 1/2003 | Bille ............................ 606/5 |
| 2003/0107711 A1 | 6/2003 | Wang |

* cited by examiner

PROJECTION ILLUMINATION SYSTEM WITH TUNNEL INTEGRATOR AND FIELD LENS

RELATED APPLICATION

This application is a continuation of U.S. Ser. No. 10/412,021 filed on Apr. 11, 2003 now U.S. Pat. No. 6,857,752, the entire disclosure of which is incorporated by reference in its entirety herein.

FIELD OF THE INVENTION

The present invention relates in general to illumination systems for projectors, and more particularly to illumination systems for projectors incorporating tunnel integrators.

BACKGROUND

Projection systems, for projecting an image on to a screen, use several different components for providing efficient illumination of an imager. Projection systems typically use a lamp generate the illumination light, with several optical elements being interposed between the lamp and the imager to transfer the light to the imager. An imager is an article that impresses an image on a beam of light. It may perform this function through different mechanisms, for example by absorption, as with a photographic slide, by polarization, as with a liquid crystal display (LCD), or by diverting the light, as with a micromechanical array of individually addressable, tiltable mirrors. Some imagers, such as a photographic slide, are made to impose color on the beam of light inherently. Others, such as the micromechanical array of tiltable mirrors, require that the color be imposed by breaking the light into primary colors and supplying them separately to the imager or imagers. If the number of imagers present in the projection system is less than the number of primary colors, then the different colors are normally supplied to the imager one after the other. This process is referred to as field sequential color. If the number of imagers is equal to the number of primary colors, then the light can be supplied to the imagers simultaneously. Both methods are widely used.

Different methods are used to homogenize the intensity of the light incident on the imager or imagers from the lamp. Tunnel integrators are one approach of homogenizing the light intensity. The tunnel integrator is typically a tube or rod, often circular in cross-section although this is not a requirement. The light, directed into one end of the tunnel integrator, passes along the tube or rod via multiple reflections at the wall of the integrator to the output end. The multiple reflections within the tube or rod result in the output from the tunnel integrator being more uniform than at the input end. The light may be reflected within the rod using total internal reflection, or using front surface reflection. A hollow tunnel integrator using front-surface reflection does not refract the incoming light, and so may be able to homogenize the incident light over a shorter distance than an internally reflecting tunnel integrator.

SUMMARY OF THE INVENTION

An illumination system with a tunnel integrator also typically includes one or more relay lenses that form an image of the exit end of the tunnel integrator on the imagers. In addition, they also form an image of the entrance end of the tunnel at some location within the illumination system. Because the entrance end of the tunnel is the stop of the illumination system, its image is a pupil location. A secondary aperture stop may be placed at this location to block stray light. Alternatively, if there is an optical element, such as a lens or a filter, in this location, then the aperture of this element forms a secondary stop. If the location of the pupil is unfavorable, it is necessary to use larger diameter lenses in the illumination system. If the larger lenses are not used, vignetting results, which reduces the uniformity of the brightness of the projected image. Larger diameter lenses add to the cost and complexity of the illumination system.

In view of this problem, the present invention generally relates to a tunnel integrator incorporated with a field lens. In particular, the present invention is directed to the use of a field lens adjacent to the exit end of the tunnel integrator in an illumination system for a projector. One of the purposes of this lens is to form an image of the entrance end of the tunnel integrator at the secondary stop of the illumination system when combined with other relay and/or imager field lenses in the illumination system. If the plane imaged on to the stop is not in the plane of the entrance end of the tunnel integrator, then the light is vignetted by the stop.

This permits the amount of light passing through the illumination system to be maximized and maintains uniform image brightness. The diameter, and therefore the cost, of the relay/imager field lenses may thus also be reduced. The present invention may be applied to photographic slide projectors and enlargers, as well as projectors based on electronic imagers.

One particular embodiment of the invention is directed to an illumination system that comprises a light source producing illumination light and a tunnel integrator disposed to homogenize the illumination light. The tunnel integrator has an input end and an output end. A tunnel integrator field lens is disposed proximate the output end of the tunnel integrator. At least one imager disposed to receive the illumination light. A relay lens system is disposed between the tunnel integrator field lens and the at least one imager to relay the illumination light from the tunnel integrator to the at least one imager. The relay lens system comprises at least a first relay lens. A first aperture stop is disposed beyond the first relay lens from the tunnel integrator field lens.

Another embodiment of the invention is directed to a projection system that comprises a light source producing illumination light and a tunnel integrator disposed to homogenize the illumination light. The tunnel integrator has an input end and an output end. A tunnel integrator field lens is disposed proximate the output end of the tunnel integrator. The tunnel integrator field lens is a negative lens. At least one imager is disposed to receive the illumination light. A relay lens system is disposed between the tunnel integrator field lens and the at least one imager to relay the illumination light from the tunnel integrator to the at least one imager. The relay lens system comprises at least a first relay lens.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
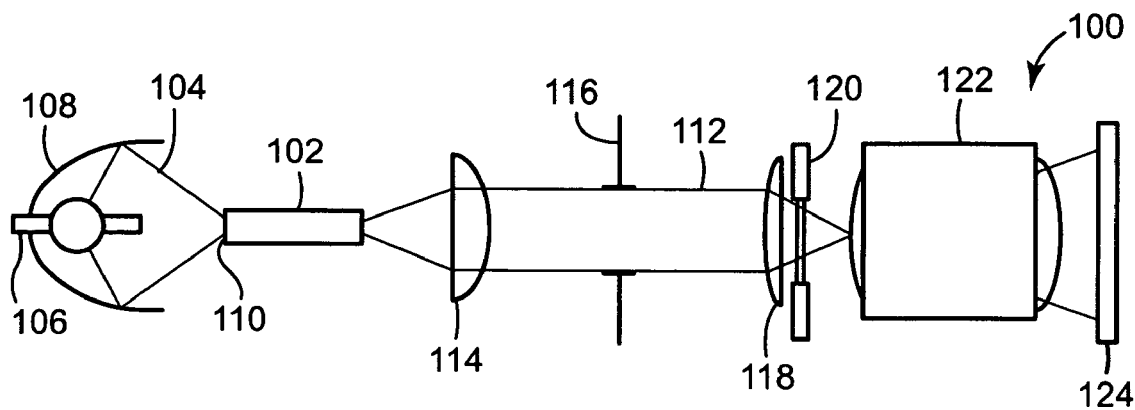
FIG. 1 schematically illustrates an embodiment of a prior art projection system having a tunnel integrator.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

In general, the present invention is directed to tunnel integrators useful for uniformizing the illumination of the image in projection systems.

A prior art illumination system 100 incorporating a tunnel integrator 102 is shown schematically in FIG. 1. Light 104 from the lamp 106 is focused by an elliptical reflector 108 into the input end 110 of the tunnel integrator 102. The light 112 exiting the tunnel integrator 102 is collimated by a condensing lens 114, also referred to as a relay lens, and then passes through an aperture stop 116. The light then passes through the imager field lens 118, the transmissive imager 120 and the projection lens 122 to a screen 124.

Figure 2:
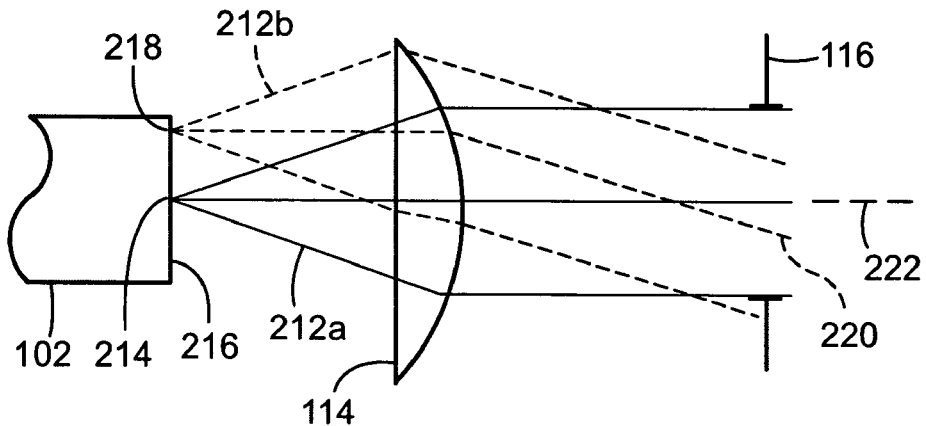
FIG. 2 schematically illustrates features of the projection system of FIG. 1 in detail.

The transmission of light from the end of the tunnel integrator 102 is more clearly shown in the schematic illustration of FIG. 2. Light rays 212 exit the tunnel integrator 102, to be collimated by the lens 114 and proceed towards the aperture stop 116 of the illumination system 100. Substantially all of the light 212a from point 214 at the center of the exit face 216 of the tunnel integrator 102 is collected by the lens 114 and passes through the stop 116. The same need not be true, however, for the light 212b from a point 218 at the edge of the integrator's exit face 216, and some of the light 212b is blocked by the stop 116. This blocking, or vignetting, causes the edges and corners of the projected image to be darker than at the center. The central ray 220 from point 218 crosses the optical axis 222 before the stop 116, although it will be appreciated that the central ray 220 may also cross the axis 222 after or, in some configurations at, the stop 116.

Figure 3:
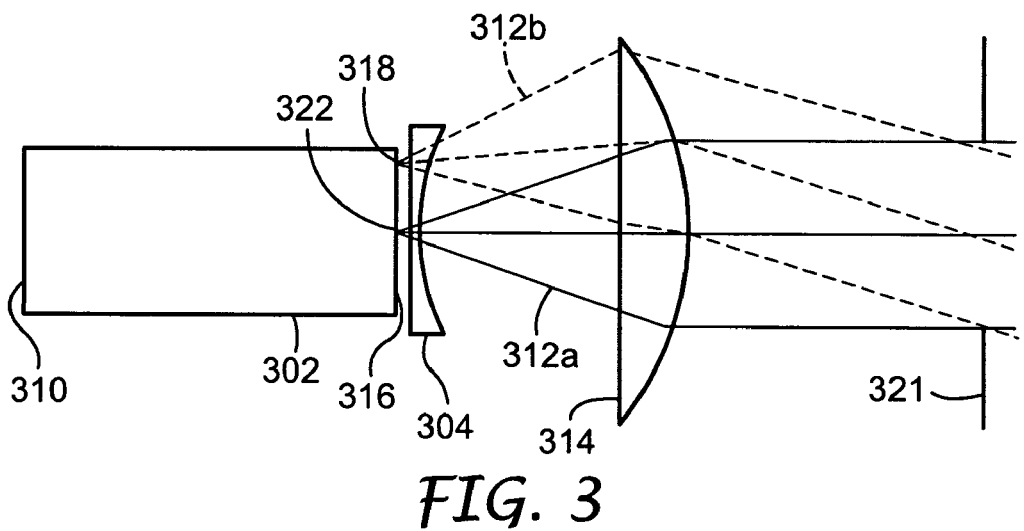
FIG. 3 schematically illustrates features of an embodiment of a projection illumination system having a field lens positioned at the output end of the tunnel integrator according to principles of the present invention.

In one particular embodiment of the present invention, illustrated schematically in FIG. 3, a lens 304, referred to as an integrator field lens, is placed adjacent the output end 316 of a tunnel integrator 302. The field lens 304, in combination with other lenses, such as the relay lens 314, causes the input end 310 of the tunnel integrator 302 to be imaged approximately onto the plane of the aperture stop 321. The relay lens 314 may also be referred to as a condensing lens. Thus, as much of the light 312b from point 318 at the edge of the tunnel integrator's output end 316 passes through the stop 316 as light 312a from point 322 at the center of the output end 316. This provides more uniform illumination of the projected image.

A field lens is placed near the object or image in an optical system. The purpose of a field lens used in an illumination system is to modify the direction of beams of light in the area of the object or image away from the center. This modification relocates the place where the chief (central) rays of these beams cross the optical axis of the illumination system, that is, the stop. In imaging lenses, a field lens may also serve to modify the field curvature, distortion and/or lateral color of the lens.

The tunnel integrator 302 may be a solid rod, for example formed from glass or some other transmitting material, with the transmitted light being homogenized via total internal reflection off the rod surfaces. In another approach, the tunnel integrator 302 may be formed from a hollow reflective tunnel, with front surface reflectors defining the tunnel walls. Light from an illumination source enters the tunnel at the entrance end 310 and leaves from the output end 316. The light is homogenized by multiple reflections off the front surface reflecting walls so that the illumination becomes nominally uniform at the output end 316 of the tunnel integrator 302.

In the absence of the field lens 304 at the output end 316 of the tunnel integrator 302, the relay lens 314 forms an image of the entrance end 310 of the tunnel integrator somewhere downstream in the illumination system. The introduction of a field lens 304 enables the optical designer to place the image of the entrance end 310 of the tunnel integrator 302 at the stop 316.

One important feature of the present invention is that the field lens 304 at the output end 316 of the tunnel integrator 302 may be a negative lens, and thus diverges the light passing out from the tunnel integrator 302. This use of a negative field lens 304 is particularly important if the distance from the condensing lens 314 to the stop 316 is greater than the distance from the condensing lens 314 to the image of the input end 310 of the tunnel integrator 302 that would be formed in the absence of the field lens 304. There are situations, however, in which the field lens 304 of the present invention may be positive. A positive field lens 304 is particularly useful where the distance from the condensing lens 314 to the stop 316 is less than the distance from the condensing lens 314 to the image of the input end 310 of the tunnel integrator 302 that would be formed in the absence of the field lens 304.

Figure 4:
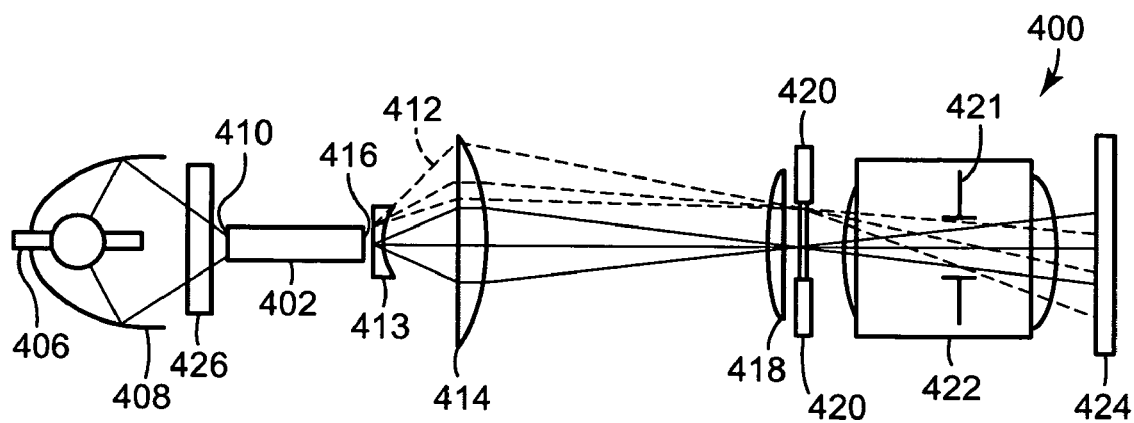
FIG. 4 schematically illustrates an embodiment of a projection illumination system according to principles of the present invention.

In one particular embodiment of a projector illumination system 400, schematically illustrated in FIG. 4, the imager 420 is transmissive, such as a photographic slide, or transmissive LCD display unit. The illumination system 400 includes a light source 406 that directs light 404 to a tunnel integrator 402. A reflector 408, for example an elliptical reflector, may be used to increase the amount of light reaching the input end 410 of the tunnel integrator 402. The light source 406 may comprise, for example, a halogen lamp, a high pressure mercury arc lamp, a metal halide arc lamp, or some other type of source for generating the illuminating light.

The light 412 exiting from the tunnel integrator 402 passes through the integrator field lens 413, adjacent to the output end 416 of the tunnel integrator 402, through the relay lens 414, also referred to as a condensing lens, and the imager field lens 418. This combination of lenses 413, 414 and 418 produces an image of the entrance end 410 of the tunnel integrator 402 at the entrance pupil 421 of the projection lens system 422. The projection lens system comprises one or more lenses for projecting the image from the imager to the screen 424.

In this particular embodiment, the stop 421 of the projection lens 422 also serves as the stop of the illumination system, and no additional physical stop is present. In addition, the exit end 416 of the tunnel integrator 402 may be imaged on to the imager 420 to produce a uniformly illuminated image on the screen 424. It will be appreciated that other configurations of projection system 400 may include an aperture stop separate from the stop of the projection lens system 422.

In one approach, the imager 420 may be a color, transmissive LCD imager. In another approach, color separation optics may be placed between the relay lens 414 and the imager field lens 418, and color recombination optics placed between the imager 420 and the projection lens 422. In such a case, parallel, monochrome transmissive LCD imagers may be used for imposing the image on the light. In another embodiment, the imager 420 may comprise a single, monochrome imager used in field sequential color mode where a color selector 426, such as a color wheel, is positioned at some point between the lamp 406 and the screen 424. In the illustrated embodiment, the color selector 426 is disposed close to the input end 410 of the tunnel integrator 402. In field sequential color mode, the color selector 426 selects one color band and the imager 420 synchronously imposes the image corresponding to that selected color band. A short time thereafter, the next color band is selected by the color selector 426 and the imager synchronously imposes the image corresponding to that next color band. This process is repeated for all color bands and is then repeated for each successive image frame. The viewer's eye integrates the resulting image to see a multiple color image, even though only one color is projected at any one time.

Figure 5:
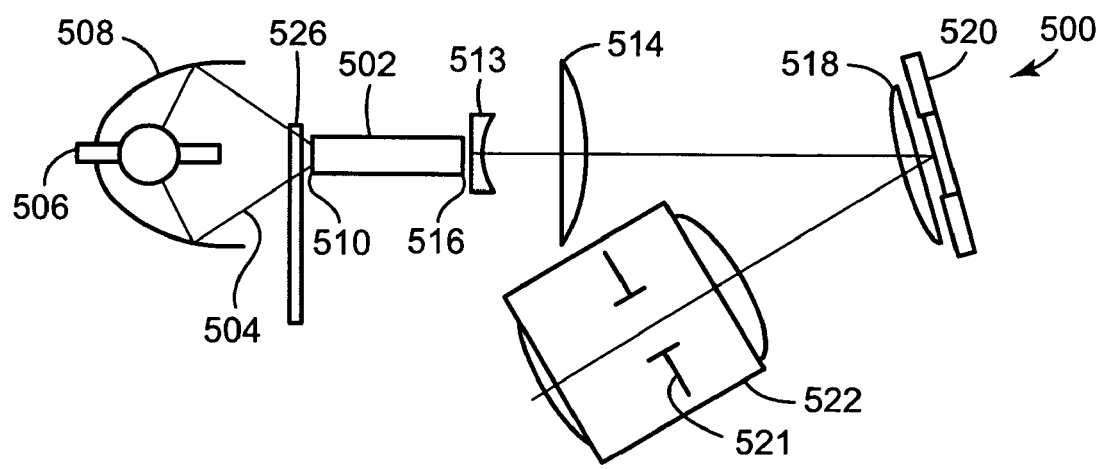
FIG. 5 schematically illustrates another embodiment of a projection illumination system according to principles of the present invention.

Another embodiment of a projector illumination system 500 according to principles of the present invention is schematically illustrated in FIG. 5. The illumination system 500 includes a light source 506 that directs light 504 to a tunnel integrator 502. A reflector 508, for example an elliptical reflector, may be used to increase the amount of light reaching the input end 510 of the tunnel integrator 502. Light passing from the output end 516 of the tunnel integrator 502 is transmitted through the integrator field lens 513 to the relay lens 514 and thence through the imager field lens 518 to the reflective imager 520. The reflective imager 520 may be, for example, a microelectromechanical system (MEMS) imager that uses an array of pixel mirrors to direct selected portions of the incoming light beam back through the imager field lens 518 to the projection lens system 522. The aperture stop 521 in this particular embodiment is located in the projection lens system 522.

The reflective imager 520 may be used in a field sequential color mode by placing a color selector 526, such as a color wheel or the like, along the path between the light source 506 and the projection screen (not shown). In the illustrated embodiment, the color selector 526 is disposed close to the input end 510 of the tunnel integrator 502.

Figure 6:
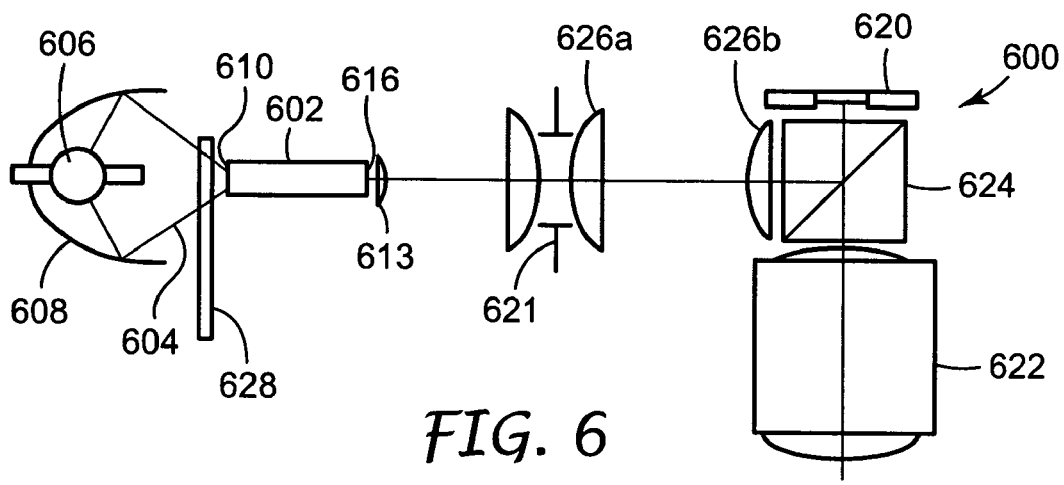
FIG. 6 schematically illustrates another embodiment of a projection illumination system according to principles of the present invention.

Another embodiment of a projector illumination system 600 according to principles of the present invention is schematically illustrated in FIG. 6. The illumination system 600 includes a light source 606 that directs light 604 to a tunnel integrator 602. A reflector 608, for example an elliptical reflector, may be used to increase the amount of light reaching the input end 610 of the tunnel integrator 602. Light passing from the output end 616 of the tunnel integrator 602 is transmitted through the integrator field lens 613 to the relay lens 614 which, along with the tunnel field lens 613, forms an image of the input end 610 of the tunnel integrator 602 at the aperture stop 621.

The light passing through the aperture stop 621 is collected by lenses 626a and 626b and transmitted via a polarizing beamsplitter 624 onto the imager 620.

The imager 620 modulates the incident light by changing the polarization state of various portions of the incident beam. The reflected, modulated light is incident on the polarizing beamsplitter (PBS) 624. A PBS reflects light polarized in one direction and transmits light polarized in the orthogonal direction, hence the PBS separates the image light from the non-image light by reflecting the non-modulated portions of the beam. Those portions of the light transmitted through the PBS 624 are passed to a projection lens assembly 622, which comprises one or more lenses. The image is then projected by the projection lens 622 to the screen (not shown).

A color separator 628, for example a color wheel, may be used to separate light of different colors generated by the light source 606 so that light in one color band, e.g. red green or blue, is incident on the imager 620 at any one time. Such a color separator may be placed anywhere in the optical system before the imager 620, but is typically placed before the tunnel integrator 602. Another type of color separator that may be used is a polarization-based color separator. A polarization-based color separator may be placed anywhere within the system, for example before the PBS 624. Synchronization of the color separator 628 with the imager 620 permits the single image 620 to project images of different colors that are perceived by the viewer as a single image of multiple colors.

Figure 7:
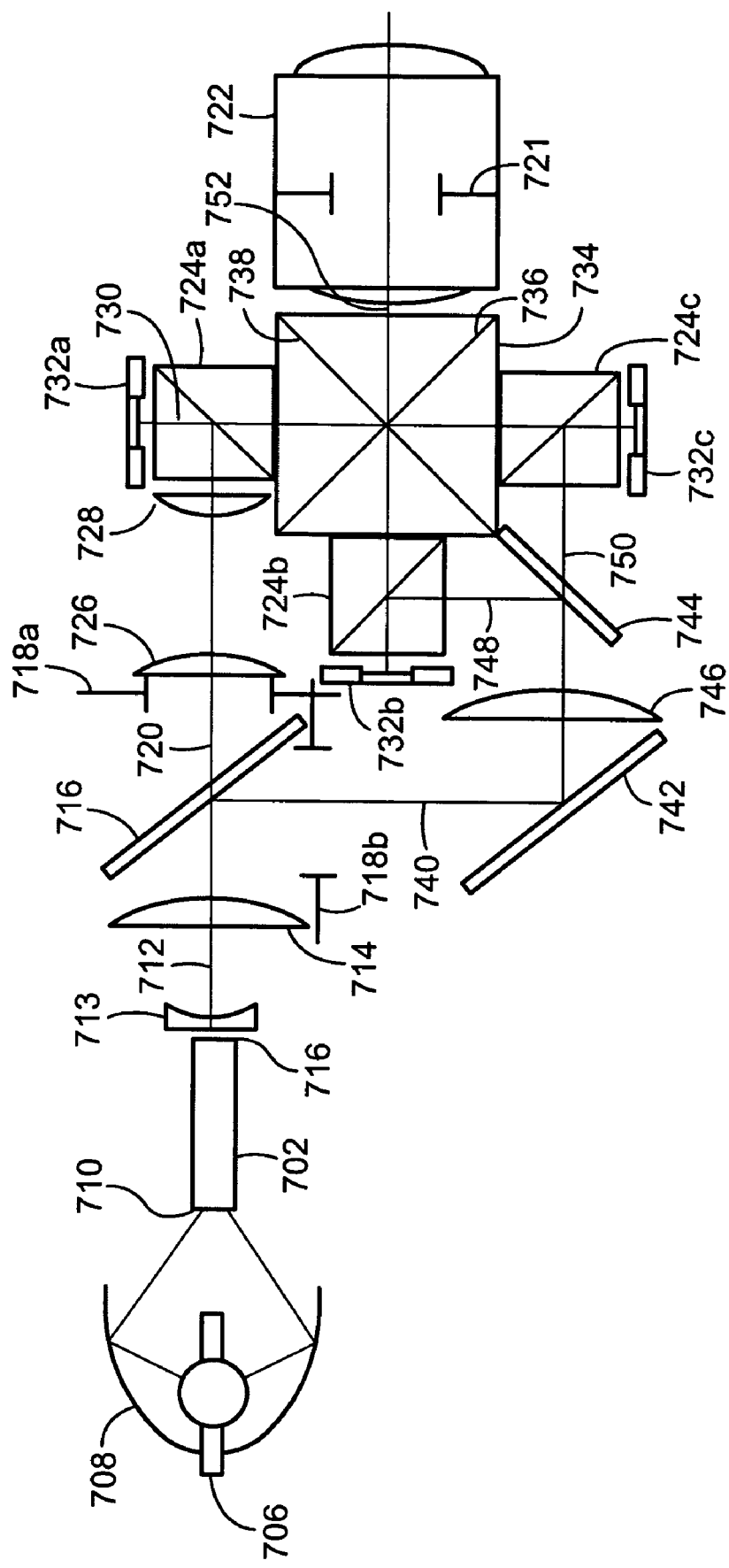
FIG. 7 schematically illustrates another embodiment of a projection illumination system according to principles of the present invention.

Another embodiment of a projector illumination system 700, based on multiple reflective imagers, is schematically illustrated in FIG. 7. The illumination system 700 includes a light source 706 that directs light 704 to a tunnel integrator 702. A reflector 708, for example an elliptical reflector, may be used to increase the amount of light reaching the input end 710 of the tunnel integrator 702. Light 712 output from the output end 716 of the tunnel integrator 702 passes through the integrator field lens 713 to the relay lens 714.

A color separator 716, such as a dichroic mirror or the like, may be used to separate the light from the tunnel integrator 702 into first and second color bands. In the illustrated embodiment, a dichroic mirror is placed after the relay lens 714. Light in the first color band is transmitted through the color separator 716 and light in the second color band is reflected by color separator. In the following discussion, the first color band is taken as being red and the second color band is taken as being cyan. It will be appreciated that other combinations of colors may be in the first and second color bands.

The optical branch for light transmitted through the color separator 716 is referred to hereafter as the first branch and the optical branch for light reflected by the separator 716 is referred to as the second branch. The first and second branches contain respective aperture stops 718a and 718b. The field lens 713 and the relay lens 714 may combine to form an image of the input end 710 of the tunnel integrator 702 at the stops 718a and 718b.

In the illustrated embodiment of illumination system 700 there is a physical stop 718a and 718b in the first and second branches respectively. The physical stops 718a and 718b are separate from the stop 721 in the projection lens system 722, and may be imaged onto the stop 721 in the projection lens system for maximum transmission. The stops 718a and 718b are useful for blocking stray light.

The light 720 transmitted through the dichroic separator 716 passes through the stop 718a and one or more lenses to a first PBS 724a. In the illustrated embodiment, the light 720 is passed through two relay lenses 726 and 728 before reaching the first PBS 724a.

The light 730 in one polarization state is reflected by the first PBS 724a to the first imager 732a. The first imager 732a may be a polarization modulation imager that rotates the polarization of light incident on certain pixels of the imager. One such type of imager is a liquid crystal on silicon (LCOS) imager. The first imager 732a reflects the light and polarization modulates some parts of the light. Those parts of the beam whose polarization has been modulated are transmitted through the first PBS 724a to the x-cube color combiner 734. The light 730 incident on the first PBS 724a that is not reflected to the first imager 732a is typically transmitted through the PBS 724a. This transmitted light may be recovered and used to illuminate the imager 732a.

An x-cube color combiner 734 is made with dichroic coatings on the diagonal faces. One diagonal face reflects one color band while the transmitting the other two color bands, while the other diagonal face reflects one of the other color bands and transmits the remaining color bands. For example, the first diagonal face 736 may reflect red light while transmitting blue and green light, whereas the second diagonal face 738 may reflect blue light while transmitting red and green light. The light from the first imager 732a is reflected by the first diagonal face 736 of the x-cube color combiner and proceeds to the projection lens system 722.

The light 740 in the second color band that is reflected by the dichroic separator 716 passes through the second stop 718b and may be directed, for example, a turning mirror 724 to a second color separator 744. The second color separator 744 may be a dichroic mirror. The light 740 propagating along the second branch may pass through one or more lenses: the illustrated embodiment shows the light 740 passing through a relay lens 746.

The second color separator 744 separates the light 740 into two beams 748 and 750 of different color bands. For example, the beam 748 may contain green light while the beam 750 contains blue light. The light in beam 748 is directed to a second PBS 724b which directs light in one polarization to the imager 732b. The imager 732b rotates the polarization of selected portions of the beam 748, which are then reflected and transmitted through the second PBS 724b to the x-cube color combiner 734.

Similarly, the light 750 transmitted through the second color separator 744 passes to the third PBS 724c, which reflects light in one polarization to the third imager 732c. The third imager 732c rotates the polarization of certain selected portions of the light 750 which are reflected and transmitted through the third PBS 724c to the x-cube color combiner 734. The x-cube color combiner 734 combines the image light received from the three imagers 732a, 732b and 732c into a single image beam 752 which is then transmitted via the projection lens system 722 to an image viewing surface, such as a projection screen.

In general, as a lens is displaced from its associated aperture stop, the height of the chief ray increases, thus necessitating a larger diameter lens. The aperture stop in some other projection systems is placed at the first relay lens that follows the tunnel integrator. Consequently, any lenses that follow the first relay lens in such systems become large, which increases the cost of these lenses, and increases the space taken up by the projection system.

In a projection system according to the present invention, however, the aperture stop is not placed at the first relay lens following the tunnel integrator lens, but is placed downstream of the first relay lens. For example, the aperture stop may be placed between the first relay lens and the imager, or imagers. Placing the aperture stop closer to the center of the illumination system permits the maximum lens diameter to be reduced, thus providing savings in cost and space. For example, where the stop is placed approximately midway between the first relay lens and the following lens, the diameters of the first relay lens and the following lens may be reduced to minimum values, thus reducing the cost of the system. In illustration, referring again to FIG. 7, the stop 718b in the second branch may be placed approximately midway between the first relay lens 714 and the second relay lens 746. In another example, the stop 718a in the first branch may be placed approximately midway between the first relay lens 714 and the third relay lens 728. Since the middle relay lens 726 is close to the aperture stop 718a, its diameter is set by the stop 718a, the diameter of which is chosen to optimize the amount of light projected by the projector. The diameter cannot be reduced without losing light throughput. Placing the integrator field lens immediately following the tunnel integrator permits the aperture stop to be placed beyond the first relay lens, and so the savings in lens diameters are realizable.

Figure 8:
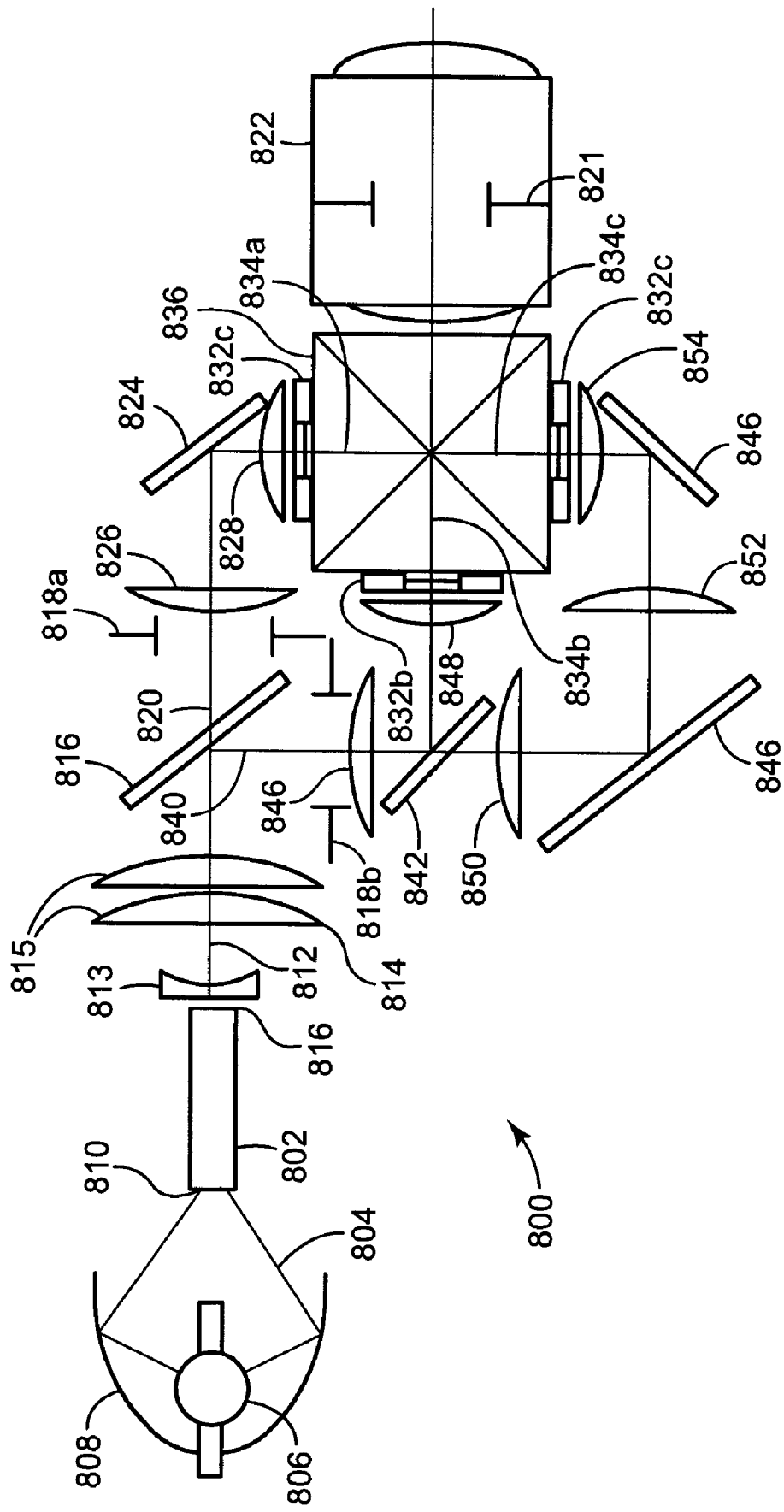
FIG. 8 schematically illustrates another embodiment of a projection illumination system according to principles of the present invention.

Another embodiment of a projector illumination system 800, based on multiple transmissive imagers, is schematically illustrated in FIG. 8. The illumination system 800 includes a light source 806 that directs light 804 to a tunnel integrator 802. A reflector 808, for example an elliptical reflector, may be used to increase the amount of light reaching the input end 810 of the tunnel integrator 802. Light 812 output from the output end 816 of the tunnel integrator 802 passes through the integrator field lens 813 to the relay lens system 814. The relay lens system includes lenses that direct an image of the output face 816 of the tunnel integrator 802 to the imagers. The relay lens system 814 may include any suitable number of lenses. In the particular embodiment illustrated, the relay lens system includes a first relay lens pair 815.

A first color separator 816, such as a dichroic mirror or the like, may be used to separate the light from the tunnel integrator 802 into first and second color bands. In the illustrated embodiment, a dichroic mirror is placed after the first relay lens pair 815. Light 820 in the first color band is transmitted through the color separator 816 and light 840 in the second color band is reflected by color separator. In the following discussion, the first color band is taken as being red and the second color band is taken as being cyan. It will be appreciated that other combinations of colors may be in the first and second color bands.

The optical branch for light transmitted through the color separator 816 is referred to hereafter as the first branch and the optical branch for light reflected by the separator 816 is referred to as the second branch. The first and second branches contain respective aperture stops 818a and 818b. The field lens 813 and part of the relay lens system 814, for example the first relay lens pair, combine to form an image of the input end 810 of the tunnel integrator 802 at the aperture stops 818a and 818b. This increases the light throughput of the system and increases the uniformity of the image brightness.

The light 820 passes through the stop 818a and one or more lenses to a steering reflector 824a. In the illustrated embodiment, the light 820 is passed through two relay lenses 826 and 828, and reflects off a steering reflector 824 before reaching the first transmissive imager 832a. Image light 834a, transmitted from the transmissive imager 832a, enters a color combining unit 836, for example an x-cube color combiner, and is directed towards the projection lens system 822.

The light 840 in the second color band that is reflected by the dichroic separator 816 passes through the second stop 818b. A second color separator 842 may be used to split the second color band into first and second color sub-bands. For example if the light 840 is cyan, then the second color separator 842 may be used to split the light 840 into a green band and a blue band. The second color separator 842 directs light in the first color sub-band, for example green light, towards a second transmissive imager 832b. The second color separator 842 may be a dichroic mirror. The light transmitted through the second color separator 842, for example blue light, may be directed by steering mirrors 846, to a third transmissive imager 832c.

The light 840 propagating to the second or third transmissive imagers 832b and 832c may pass through one or more relay lenses that form part of the relay lens system 814. In the illustrated embodiment, the light in the first color sub-band passes through relay lenses 846 and 848. The light in the second color sub-band passes through relay lenses 846, 850, 852 and 854. The relay lens system 814, comprising lenses 815, 826, 828, 846, 848, 850, 852 and 854 may be used to image the input end 810 of the tunnel integrator 802, via the different imagers 832a, 832b and 832c, to the stop 821 of the projection lens system.

The image light beams 834b and 834c respectively transmitted through the second and third transmissive imagers 832b and 832c is combined with the image light beam 834a from the first transmissive imager 832a in the color combining unit 836. The three color image may then be passed to a projection lens system 822 for projection on a screen (not illustrated).

It will be appreciated that the above description lists only some of the embodiments of the present invention covered by the claims provided below, and that various modifications to the illustrated embodiments may be made while remaining within the scope of the present invention. For example, projection illumination systems are shown for systems based on one and three imaging units. It will be appreciated that projection systems using different numbers of imager units, for example two imager units, may also include the present invention. In another example, the number of lenses disposed between the tunnel integrator field lens and the imager or imagers may be different from that shown. For instance, there may be more than one relay lens in addition to an imager field lens.

As noted above, the present invention is applicable to projection systems and is believed to be particularly useful for increasing the brightness uniformity of the projected image, while maintaining or reducing costs of the optical components forming the system. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

I claim:

1. An optical system, comprising:
   a tunnel integrator having an input end and an output end;
   an integrator field lens disposed at the output end of the tunnel integrator, the integrator field lens having a negative optical power; and
   a relay lens system disposed on an optical path from the integrator field lens.

2. A system as recited in claim 1, further comprising an aperture stop disposed on the optical path from the integrator field lens, the relay lens system comprising at least a first lens, the first lens being disposed on the optical path between the integrator field lens and the aperture stop, the input end of the tunnel integrator being imaged at the aperture stop.

3. A system as recited in claim 2, further comprising at least one imaging device on the optical path from the integrator field lens, the output end of the tunnel integrator being imaged by the relay lens system at the at least one imaging device.

4. A system as recited in claim 3, further comprising a projection lens unit disposed to project image light from the at least one imaging device.

5. A system as recited in claim 4, wherein the aperture stop is a stop of the projection lens unit.

6. A system as recited in claim 3, wherein the at least one imaging device comprises at least one of a transmissive liquid crystal imaging device, a reflective liquid crystal imaging device and an array of mirrors.

7. A system as recited in claim 3, wherein the at least one imaging device comprises at least two imaging devices, image light from the at least two imaging devices being combined to form a single image beam.

8. A system as recited in claim 1, further comprising a light source capable of generating illumination light and arranged to direct the illumination light into the input end of the tunnel integrator.

9. An optical system, comprising:
   a tunnel integrator having an input end and an output end;
   an integrator field lens disposed at the output end of the tunnel integrator;
   a relay lens system disposed on an optical path from the integrator field lens, the relay lens system comprising at least a first lens; and
   and a first aperture stop on the optical path, the first lens of the relay lens system being disposed on the optical path between the integrator field lens and the aperture stop.

10. A system as recited in claim 9, wherein the input end of the tunnel integrator is imaged at the aperture stop.

11. A system as recited in claim 9, further comprising at least one imaging device on the optical path from the integrator field lens.

12. A system as recited in claim 11, wherein the at least one imaging device comprises at least two imaging devices, image light from the at least two imaging devices being combined to form a single image beam.

13. A system as recited in claim 11, further comprising a projection lens unit disposed to project image light from the at least one imaging device.

14. A system as recited in claim 13, wherein the first aperture stop is a stop of the projection lens unit.

15. A system as recited in claim 9, further comprising a light source capable of generating illumination light directed into the input end of the tunnel integrator.

16. A system as recited in claim 9, wherein the integrator field lens is a negative lens.

17. An optical system, comprising:
- a tunnel integrator having an input end and an output end;
- an integrator field lens disposed at the output end of the tunnel integrator;
- a relay lens system disposed on an optical path from the integrator field lens, the relay lens system comprising at least a first relay lens and forming an image of the output end of the tunnel integrator;
- a first aperture stop disposed on an optical path from the integrator field lens, the input end of the tunnel integrator being imaged at the first aperture stop.

18. A system as recited in claim 17, further comprising at least one imager device, the relay lens system forming the image of the output end of the tunnel integrator at the at least one imager device.

19. A system as recited in claim 18, further comprising a projection lens unit disposed to project image light from the at least one imager device.

20. A system as recited in claim 19, wherein the first aperture stop is a stop of the projection lens unit.

21. A system as recited in claim 18, wherein the at least one imager device comprises at least two imager devices, image light from the at least two imager devices being combined to form a single image beam.

22. A system as recited in claim 17, further comprising a light source capable of generating illumination light directed onto the input end of the tunnel integrator.

23. A system as recited in claim 17, wherein the integrator field lens is negative.

* * * * *

UNITED STATES PATENT AND TRADEMARK OFFICE
CERTIFICATE OF CORRECTION

PATENT NO.         : 7,152,981 B2
APPLICATION NO. : 11/021732
DATED              : December 26, 2006
INVENTOR(S)        : Stephen K. Eckhardt It is certified that error appears in the above-identified patent and that said Letters Patent is hereby corrected as shown below:

Col. 10, line 45, in claim 9, before "a first" delete "and".

Signed and Sealed this

Twentieth Day of March, 2007

JON W. DUDAS
*Director of the United States Patent and Trademark Office*